(12) United States Patent
Tabakman

(10) Patent No.: US 8,677,939 B2
(45) Date of Patent: Mar. 25, 2014

(54) SYSTEM AND METHOD FOR SHIFTING SCATTERED MATERIAL TOWARDS A BARRIER

(75) Inventor: Ron Tabakman, Kfar Hayim (IL)

(73) Assignee: DeLaval Holding AB, Tumba (SE)

( * ) Notice: Subject to any disclaimer, the term of this patent is extended or adjusted under 35 U.S.C. 154(b) by 178 days.

(21) Appl. No.: 12/900,207

(22) Filed: Oct. 7, 2010

(65) Prior Publication Data

US 2011/0132267 A1 Jun. 9, 2011

Related U.S. Application Data

(63) Continuation-in-part of application No. PCT/IL2009/000364, filed on Apr. 5, 2009.

(60) Provisional application No. 61/042,853, filed on Apr. 7, 2008.

(51) Int. Cl.
*A01K 1/00* (2006.01)

(52) U.S. Cl.
USPC ....................................... 119/57.92

(58) Field of Classification Search
USPC ............ 119/57.92, 51.01, 174; 15/93.1, 93.4; 172/30
See application file for complete search history.

(56) References Cited

U.S. PATENT DOCUMENTS

| | | | | |
|---|---|---|---|---|
| 2,405,811 A | * | 8/1946 | Beyer | 414/586 |
| 5,309,864 A | | 5/1994 | Harmsen et al. | |
| 5,355,834 A | | 10/1994 | Blazek | |
| 2006/0170385 A1 | | 8/2006 | Cooper | |
| 2007/0227455 A1 | | 10/2007 | Sumiya | |
| 2009/0241839 A1 | * | 10/2009 | Linsmeier | 119/28.5 |

FOREIGN PATENT DOCUMENTS

| | | |
|---|---|---|
| AT | 6016 U1 | 3/2003 |
| DE | 3821954 A1 | 1/1990 |
| DE | 4023111 A1 | 1/1992 |
| DE | 29800152 U1 | 5/1998 |
| EP | 1779722 A1 | 5/2007 |
| FR | 2862489 A1 | 5/2005 |
| JP | 11089470 A | 4/1999 |
| JP | 2007282549 A | 11/2007 |
| NL | 9400771 A | 12/1995 |

* cited by examiner

*Primary Examiner* — Kristen C Hayes
(74) *Attorney, Agent, or Firm* — Young & Thompson

(57) ABSTRACT

A material-shifting system for shifting scattered material, such as livestock feed, closer to a barrier. The system includes at least one traveling unit having an angled push-head which is coupled to a shuttle. Preferably, the shuttle is driven along a rail by a remote driving. As the shuttle travels along the rail, the push head pushes material scattered over a surface towards the barrier.

28 Claims, 9 Drawing Sheets

SYSTEM AND METHOD FOR SHIFTING SCATTERED MATERIAL TOWARDS A BARRIER

FIELD OF THE INVENTION

The present invention relates to methods and systems for shifting scattered material towards a barrier. More particularly, the present invention relates to devices for pushing livestock feed within reach of livestock enclosed within a pen.

BACKGROUND OF THE INVENTION

The present invention, in some embodiments thereof, relates to a method and system for feeding animals, such as cattle and other domesticated animals that are penned into enclosures such as a dairy barn, or a cowshed.

Animal feeding practices known in the art involve piling food next to a barrier (e.g. a concrete barrier) that is part of a fence or other confinement means separating the animals from the care taker. The confined animals, according to known practice, may reach a portion of food which is piled outside of the pen in which the animals are kept.

However, because the animals are confined access to the food is limited by the animal's bulk, some sections of the piled food typically remain out of reach to the confined animals. Furthermore, food may be pushed away from the animal by the movement of the animals head while eating. Consequently, there is a need to move the food back closer to the animal and the fence. Thus, the food needs periodic attention—by collecting, by removing or by bringing the out-of-reach portion of food closer to the confined animals.

It is noted that once the portion of food within reach has been eaten, the animals have to wait until a farmer will provide them with another portion of food, before the animals can continue feeding. This interruption to the feeding process, may result in the animals not eating the desired amount unduly reducing milk production.

Additionally, redistributing the animal feed is labor intensive. A farmer typically has to continuously attend to the feeding of the animals, by raking or otherwise bringing the out-of-reach food closer to the barrier, either manually or using machinery such as a tractor. Often, there is also a need to clean and remove leftovers.

Previous systems addressing these issues include United States Patent Application Number 2007/227455A, titled "Feed Straightening Apparatus for Livestock Barn and Method for Operating the Same" to Hiroki Sumiya.

However, this describes a self-contained unit which is expensive to run and maintain.

US2006/0170385 describes A device for placing food on a floor within reach of one or more animals, said device comprising: a mounting structure; an extendable arm having a proximal end and a distal end, said extendable arm mounted on said mounting structure at said proximal end; at least one plow attached to said extendable arm at said distal end, said plow arranged to move said food within reach of said animals; said extendable arm being movable to and storable in a position elevated from said floor; a power source; and means for extending said arm, said extending means being in communication with said power source.

There remains a need for simple, reliable and inexpensive means for moving animal feed within reach of confined livestock and the present invention addresses this need.

SUMMARY OF THE INVENTION

In accordance with one aspect, the present invention is directed to providing a material-shifting system for shifting scattered material closer to a barrier. The system comprises a rail connected to a barrier;

a travelling unit comprising: at least one push-head coupled to a shuttle;

a driving unit comprising a first remote motor coupled to said shuttle via a transmission mechanism, configured to allow driving said shuttle along the rail in at least one direction, such that said push-head pushes said scattered material towards said barrier;

folding means, configured to allow folding of the travelling unit, and unfolding means configured to allow unfolding of the travelling unit, the folding being entirely powered by the first motor.

Said transmission mechanism may for example be at least one element selected from the group: a cable-drive, a rope-drive, a chain-drive, wires, links, rollers, springs and sprockets.

The first remote motor in some embodiments is coupled to a plurality of said shuttles for moving scattered material in more than one location.

In some embodiments, first remote motor drives said shuttle selectably in either direction along said rail, the unfolding being entirely powered by the first motor.

In some embodiments the system further comprising a second remote motor, wherein said first remote motor drives said shuttle in a first direction along said rail and said second remote motor drives said shuttle in a second opposite direction along said rail, the unfolding being entirely powered by the second motor.

said push-head is preferably coupled to said shuttle via a non-extendible supporting arm.

Said supporting arm may be rotatably coupled to said push-head via a first connecting-pin perpendicular to said rail.

The system may further comprise a restraint for restricting movement of said push-head about said second connecting-pin.

Said restraint in some embodiments has an adjustable length.

Said restraint may be selected for example from at least one of a group consisting of a chain, a cable, a wire, and a rope.

The supporting arm may be rotatably coupled to said shuttle via a second connecting-pin parallel to said rail.

Said supporting arm may be rotated about said second connecting-pin thereby raising said push-head when said shuttle reaches said folding means.

The at least one said push-head may comprise at least one of the group comprising: a scraper, a blade, a comb, a brush, a toothed wheel, a chain and a shovel.

At least one said push-head may be interchangeable for at least one alternative push-head.

In some embodiments a plurality of push-heads are coupled to said shuttle.

The system may further comprise at least one shovel coupled to said shuttle for scraping dirt off said rail.

According to another aspect, an apparatus for pushing livestock feed within reach of livestock enclosed within a pen incorporating any of the systems described above is provided.

Said driving unit may comprise an automatic stop mechanism for stopping the motion of said shuttle in response to at least one of the following conditions: a. a signal is received from an extremity sensor indicating that the shuttle has reached an extremity of said rail; b. an obstruction is detected along the rail; and c. said system overheats.

According to another aspect of the invention, a method for shifting material, scattered over a surface, closer to a barrier is provided, said method comprising the steps: step (a)—providing folding means, unfolding means, and a rail connected to a barrier and at least one shuttle; step (b)—providing at least one push-head; step (c)—coupling said shuttle to a driving unit comprising a first remote motor; step (d)—coupling at least one said push-head to said shuttle, step (e)—driving said shuttle in a first direction such that said push-head travels over said surface thereby pushing scattered material towards said barrier; step (f)—further driving said shuttle until said shuttle reaches said folding means, upon which said push-head is folded; step (g)—driving said shuttle in a second opposite direction such that said push-head is unfolded and travels over said surface thereby pushing scattered material towards said barrier.

Step (c) of coupling said shuttle to a driving unit may follow step (d) of coupling said push-head to said shuttle.

Step (c) of coupling said shuttle to a driving unit may further comprise coupling said motor to a transmission mechanism, and coupling said shuttle to said transmission mechanism.

In some embodiments a plurality of push-heads are provided and a first push-head is pre-coupled to said shuttle and wherein step (d) of coupling at least one said push-head to said shuttle, further comprises the following substeps: step (d1)—removing said first push-head; step (d2)—selecting at least a second push-head, and step (d3)—coupling said second push-head to said shuttle.

In some embodiments, folding means is unfolding means.

BRIEF DESCRIPTION OF THE FIGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings: FIGS. 1a and 1b represent schematic views of a feeding area of a cowshed equipped with a single feed shifting system and two feed shifting systems, respectively, in accordance with embodiments of the present invention;

Figure 5A:
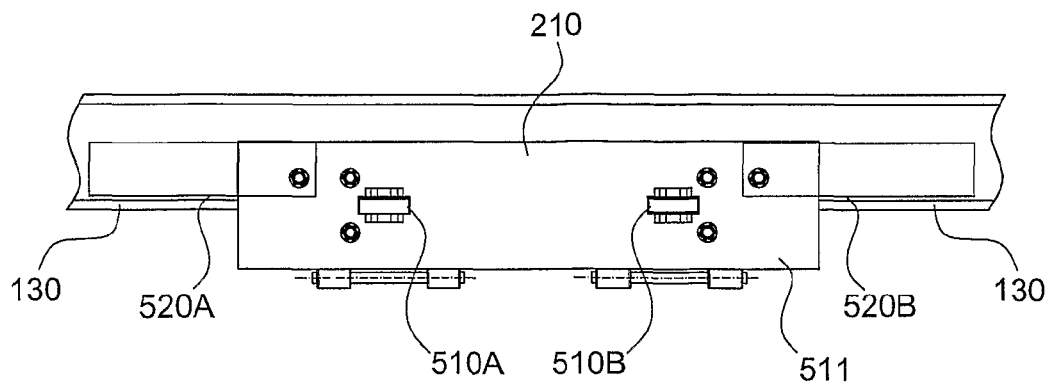
Figure 5B:
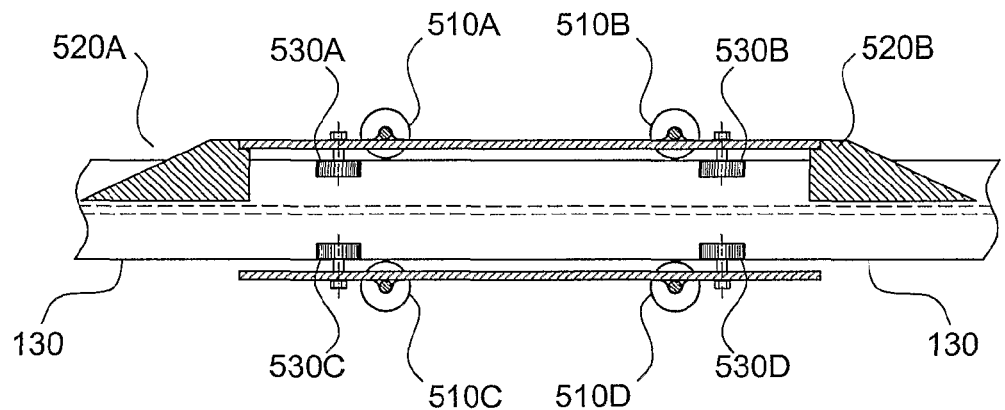
Figure 5C:
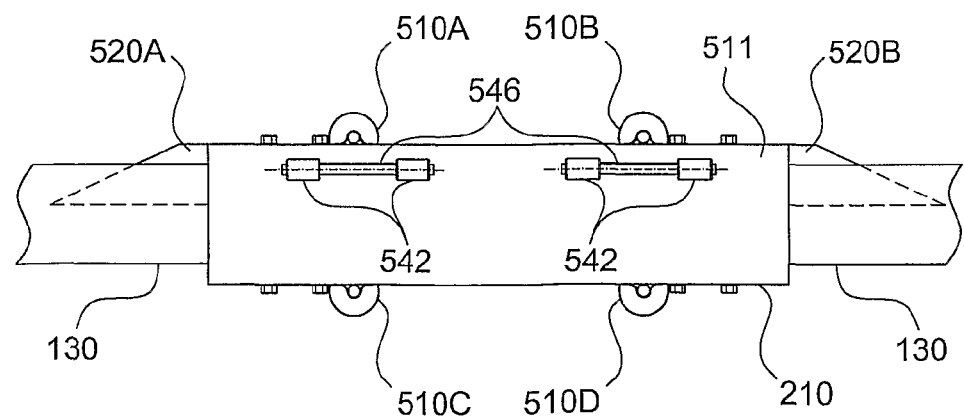
Figure 5D:
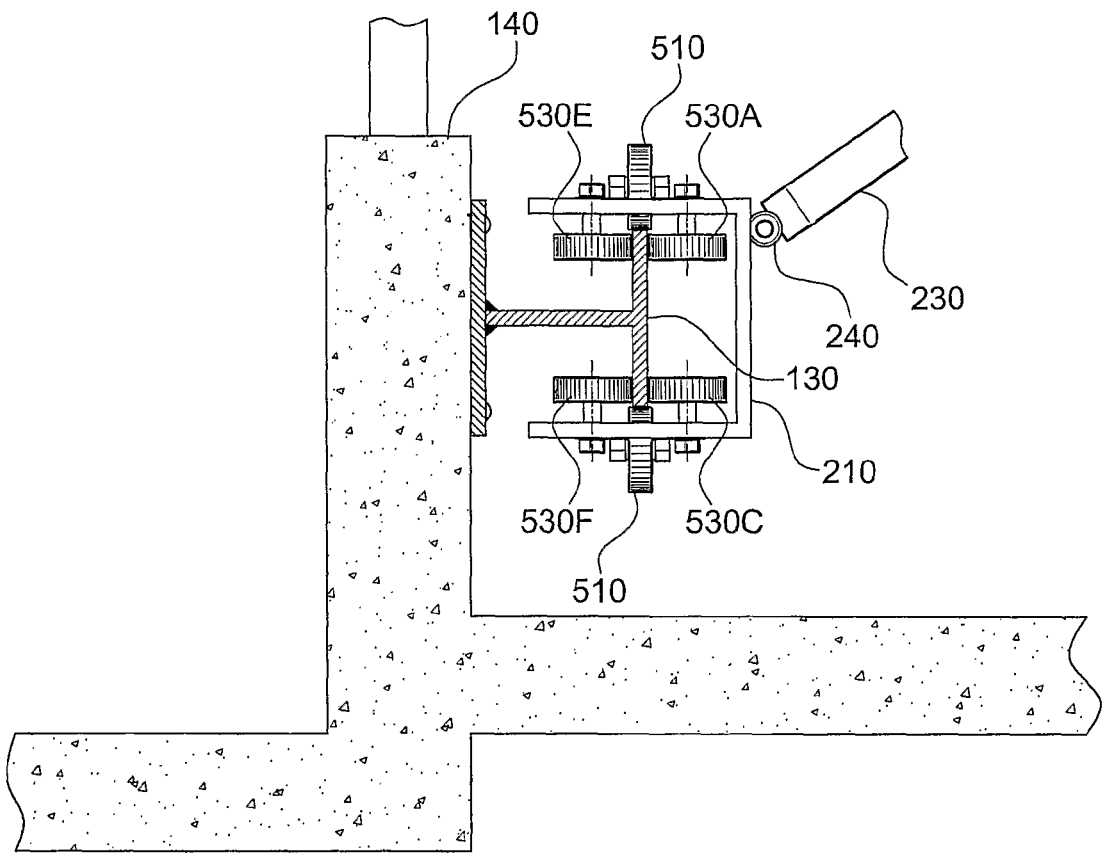
Figure 5E:
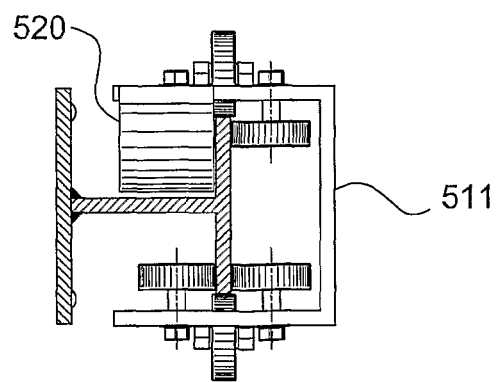
Figure 6:
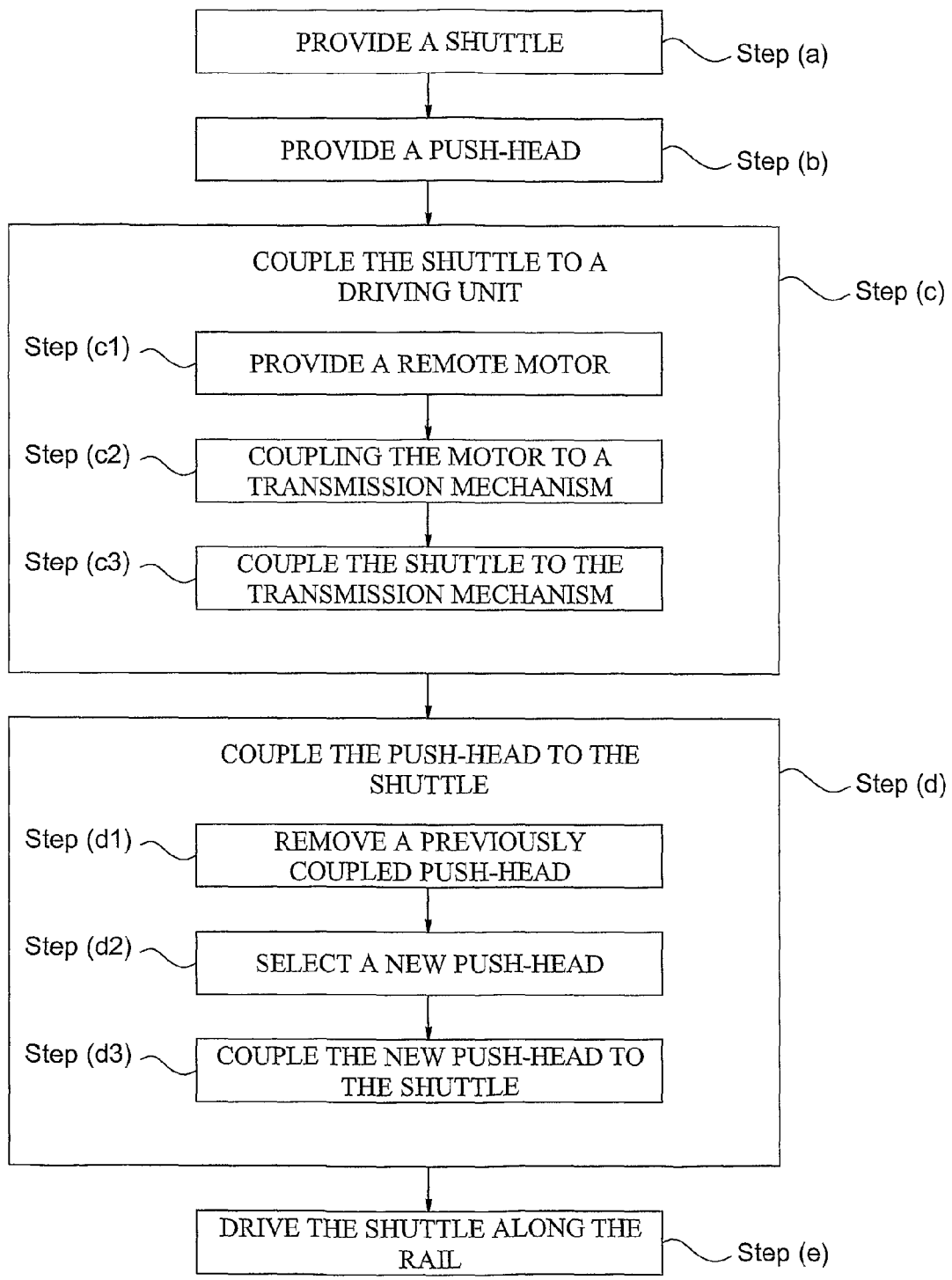

FIGS. 5a-e are various schematic representations of a shuttle mounted upon a rail for use with feed shifting systems according to still another embodiment of the present invention, and FIG. 6 is a flowchart representing a method for moving scattered material closer to a barrier according to another embodiment of the invention.

DETAILED DESCRIPTION OF THE INVENTION AND FIGS

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

Figure 1A:
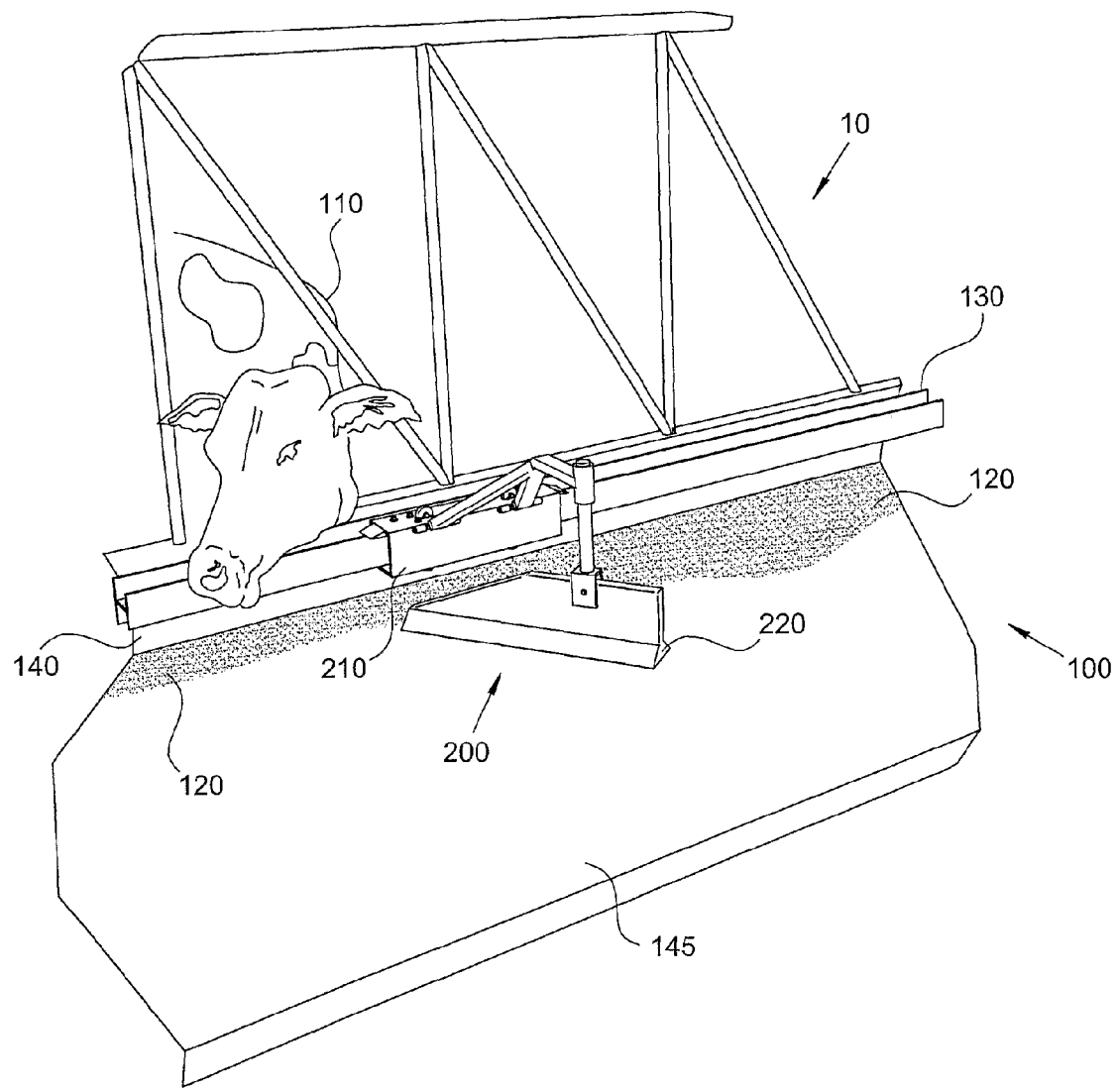
Figure 1B:
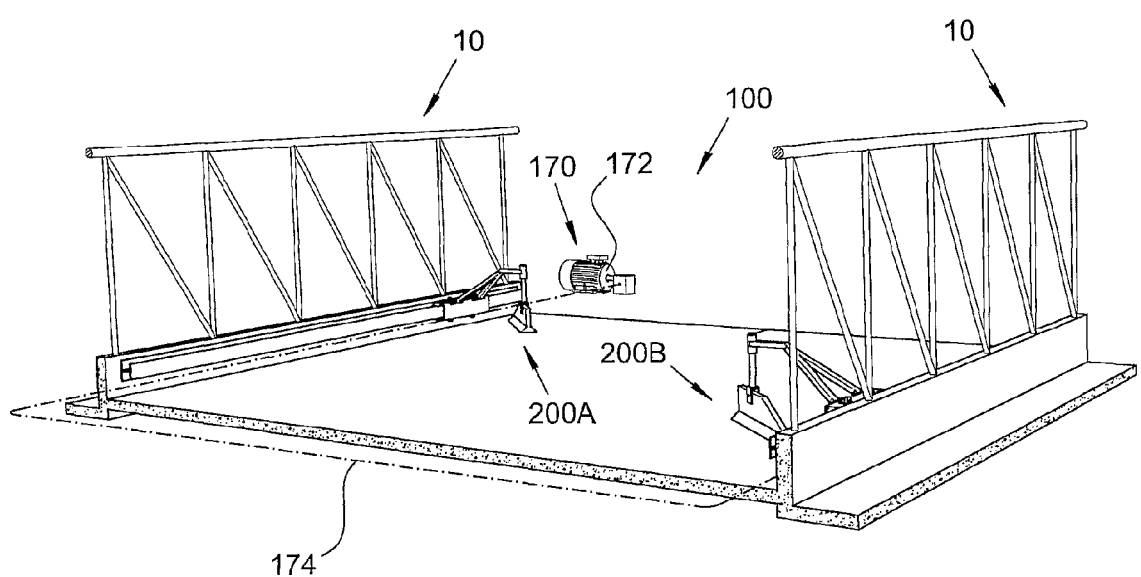

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements. Reference is made to FIGS. 1a and 1b representing schematic views of a section of a cowshed 10 equipped with a feed shifting system 100 according to embodiments of the invention. The feed shifting system 100 is configured to shift scattered animal feed 120 closer to a barrier 140 so that it may be reached by a feeding cow 110. Accordingly, the system 100 includes at least one traveling unit 200 mounted onto a rail 130. The rail 130 is attached to the barrier 140 and the traveling unit 200 includes a shuttle 210 configured to slide along the rail 130 and a push-head 220. The push-head 220 is angled such that, as the traveling unit 200 moves over a surface 145, scattered feed 120 is pushed towards the barrier 140.

It will be appreciated that the environment in which feed shifting system 100 is used is by its nature messy. Scattered material such as the animal feed 120 may easily damage working parts of the traveling unit 200 particularly the mechanical moving parts. This is particularly problematic in prior art raking devices, such as that described in United States Patent Application No. 2007/227455A to Hiroki Sumiya, referred to hereinabove. In Sumiya's system, a motorized engine is incorporated into a traveling unit which travels through the feed. Furthermore, in Sumiya's system a mechanical piston, carried by the traveling unit, is used to generate an active pushing movement. Thus Sumiya's system requires continual maintenance in order to prevent dirt and feed debris from entering the moving parts and damaging the motor or the piston. In contradistinction to the prior art, in embodiments of the present invention, easily damaged elements are typically situated remotely from the scattered material being shifted.

It is a particular feature of certain embodiments of the current invention that a driving unit 170 is provided for driving the shuttle 210 along the rail 130. Typically, the driving unit 170 includes a remote motor 172, coupled to the shuttle 210 via a transmission mechanism 174 such as a cable-drive, a rope-drive, a chain-drive, spring or the like. Other mechanisms, for example using combinations of wires, links, rollers, springs and sprockets may alternatively be employed as suits requirements. Typically, the transmission mechanism moves the shuttle 210 in either direction along the rail 130. Variously the transmission mechanism may be connected to the shuttle 210 itself or alternatively to another part of the traveling unit 200. By locating the motor 172 remotely, it is less susceptible to damage from dirt or feed debris than if it is mounted upon the traveling unit 200 itself. A further advantage of a remote motor 172 is that it may be used to pull multiple traveling units 200A, 200B located at different locations around of a cowshed as seen in FIG. 1b. A remote electrically powered motor may also minimize the electrical wiring required to power the motor, since an onboard motor will require a travelling and long wiring.

Although the embodiment of the invention described hereinabove relates to a remote motor, it is noted that where required, an onboard motor may be additionally or alternatively mounted upon the traveling unit 200 itself.

Figure 2A:
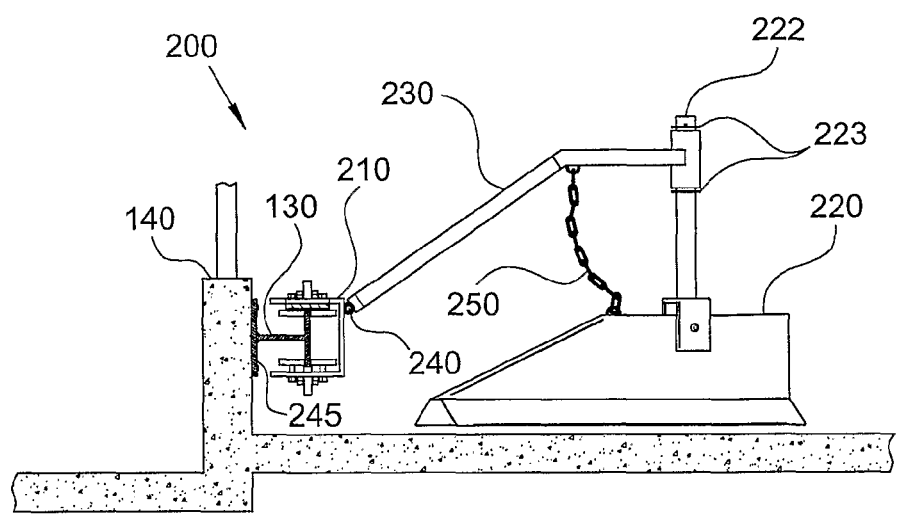
FIGS. 2a and 2b are respectively side view and top view representations of a traveling unit of a feed shifting system in accordance with another embodiment of the present invention.
Figure 2B:
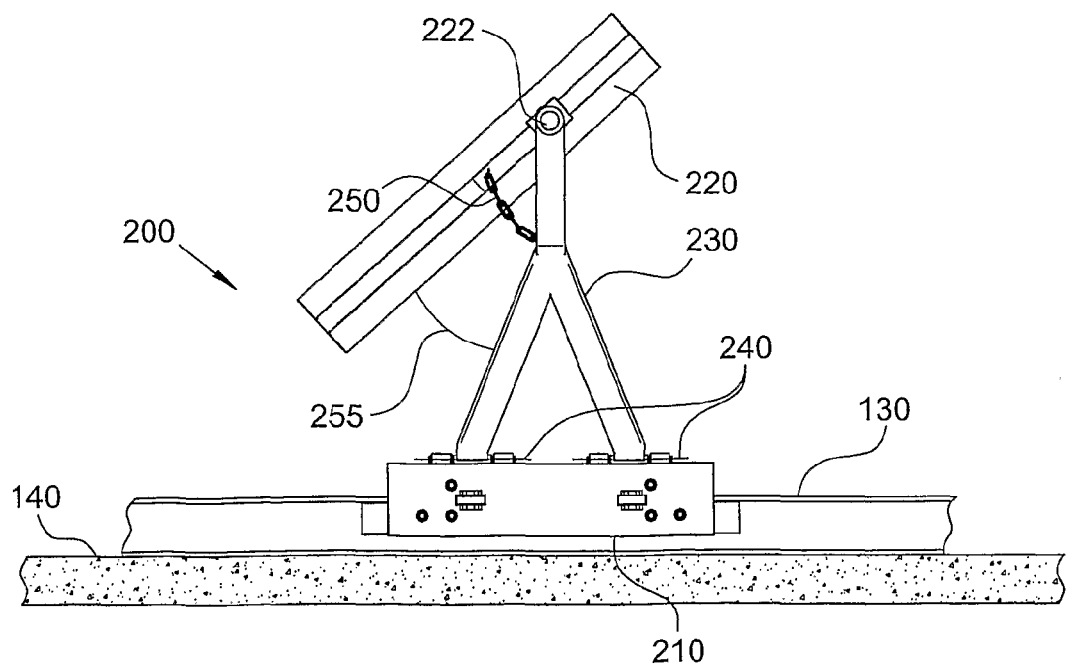

Optionally, the rail 130 may be of different shapes and may be located in different vertical locations in relation to barrier 140 and/or in relation to surface 145. However, as shown in FIG. 1, and as said above, it is connected to barrier 140; as a result, and as further shown in FIG. 1, the entire compact low-profiled travelling unit 200 is situated proximal to the barrier. The barriers used in cowsheds and the like are made as solid structures in order to prevent entry of food and refuse from the feeding surface 145 into the area where the livestock stand (not shown). It will occur that the barrier 140 thus somewhat restricts the movement of the livestock, such that they have to reach over the barrier 140 to reach the food. The reaching over action of the livestock helps minimize contact of the livestock 110 with the travelling unit 200. Young livestock may be kept in their own structures, which typically have lower barriers 140. Although rail 130 may typically be situated closer to the surface 145 than in structures such as cowsheds 10 for adult livestock 110, it has been found that the travelling unit 200 is equally unobtrusive to the tender young. Indeed in some embodiments of the invention, the barrier 140 itself may serve as the rail 130. Reference is now made to FIGS. 2a and 2b respectively side view and top view representations of a traveling unit 200 of a feed shifting system 100 according to a particular embodiment of the invention. The traveling unit 200 includes a shuttle 210, a rail 130, a bar 245, a push-head 220, and a non-extendible supporting arm 230. The shuttle 210 is configured to slide along the rail 130 approximately in parallel to the barrier 140 of an animal pen, the rail 130 is fastened to the barrier 140 by a bar 245. Optionally, the bar 245 may be replaced by several disconnected plates along the barrier 140. The supporting arm 230 is connected on one side to the shuttle unit 210 and on another side to a push-head 220 which is angled to push animal food closer to barrier 140.

Optionally, the shuttle 210 is configured to slide along the rail 130 in both directions, and the push-head 220 pushes animal food towards the barrier 140 when the shuttle 210 is driven in either direction. The push-head 220 is conveniently pivotally coupled to the supporting arm 230, via a first connecting-pin 222 and fastened by two holding pins 223. The push-head 220 is thus free to rotate about the first connecting-pin and the push-head 220 is typically substantially symmetrical in relation to the two directions, this facilitates the pushing of scattered material in either direction.

In some embodiments, a restraint 250 is provided for confining the movement of the push-head 220 around the first connecting-pin 222. The restraint 250 may be a chain, a cable, a wire, a rope or similar means. Optionally the effective length of the restraint 250 may be changed in order to change the opening angle 255 of the push-head 220 with respect to the supporting arm 230. Different angles may be preferred for different types of food. Optionally the supporting arm 230 is connected to the shuttle 210 via a second connecting-pin 240. Thus the supporting arm 230 is free to rotate upwards and downwards. It is noted that a slight upward movement during sliding may be desired when a large pile of food is being shoved by push-head 220. Although a Y-shaped supporting arm 230 is represented in the drawings, other configurations of the supporting arm may be preferred as required.

Figure 2C:
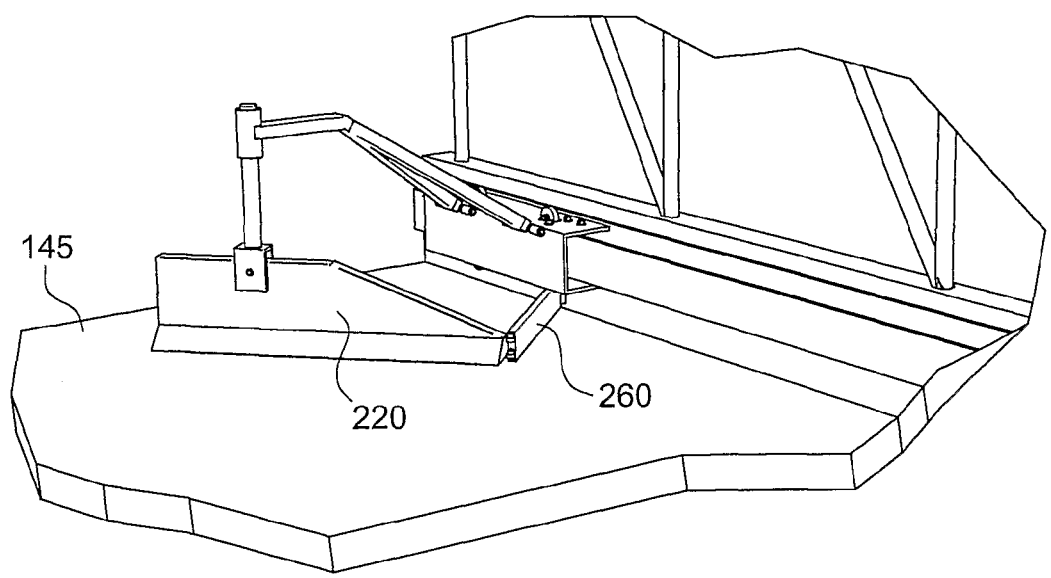
FIG. 2c is a schematic representation of a traveling unit fitted with a cleaning head according to a further embodiment of the invention.
Figure 2D:
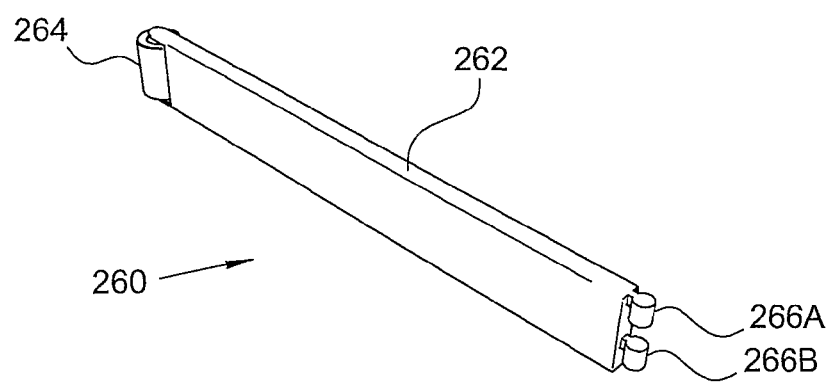
FIG. 2d and FIG. 2e show oblique and side views of the cleaning head.
Figure 2E:

FIG. 2c shows a traveling unit 200 fitted with a cleaning head 260. The cleaning head 260 is shown in greater detail in FIGS. 2d and 2e showing oblique and top views of the cleaning attachment respectively. The cleaning head 260 includes a wiper 262, a roller 264 and a pair of connecting pins 266A, 266B.

The wiper 262 is configured to remove debris from the feeding surface 145. Typically the wiper 262 consists of a strip of flexible material such as rubber, alternatively the wiper 262 may incorporate brushes or the like for dislodging residue from the feeding surface 145. The connecting pins 266A, 266B may be used to connect the cleaning head 260 to the traveling unit 200.

Optionally the cleaning head 260 is coupled directly to the push head 220, alternatively the cleaning head 260 may be coupled to other elements of the traveling unit 200. The roller 264 is configured to slide along the barrier 140 as the cleaning head 260 is drawn by the traveling unit 200.

Although embodiments of the invention are described hereinabove in relation to a feed-shifting system for moving animal feed closer to an animal pen, other embodiments may be used to move other scattered materials in other applications. Advantageously, various push-heads 220 may be implemented with various embodiments of the invention to suit the nature of the scattered material to be moved.

Figure 3:
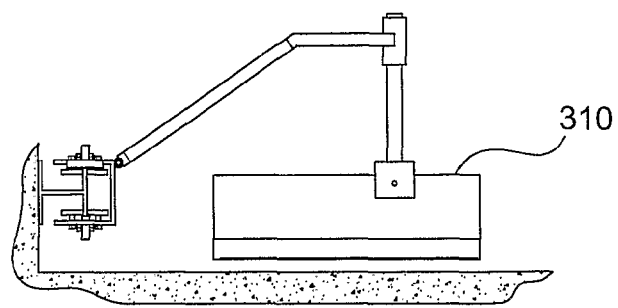
FIG. 3 shows schematic representations of various push-heads for shifting animal food in accordance with various embodiments of the present invention.
Figure 3:
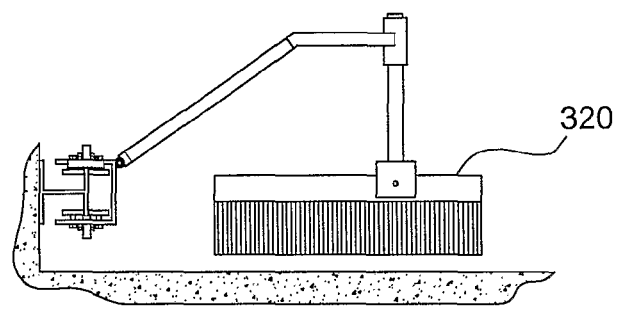
Figure 3:
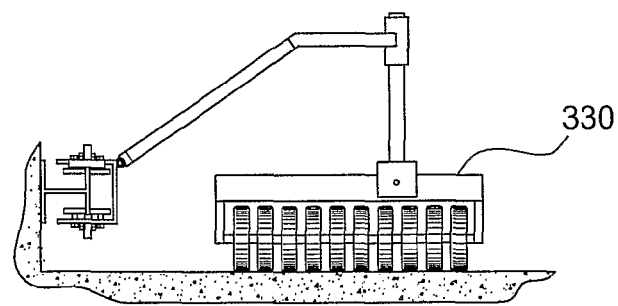
Figure 3:
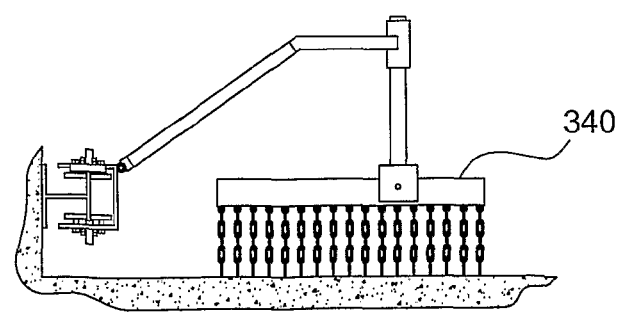

Reference is now made to FIG. 3 illustrating various options for use as the push-head 220 these include:
  a scraper or a blade 310 (operating similarly to a bulldozer blade or to a squeegee blade) for scraping sticky material, such as leftover food,
  a rake-like apparatus or a brush-like apparatus 320 (including either at least one fixed brush, or one or more rotatable brushes),
  an apparatus including multiple toothed wheels 330, and
  an apparatus including multiple suspended chains 340 or cables. Optionally a bar (not shown) may be connected to the suspended ends of multiple chains or cables. In some embodiments the push-head 220 may be exchangeable between such units to suit requirements. For example for cleaning the feeding surface 145, for sweeping heavy or light food or such like.

Figure 4A:
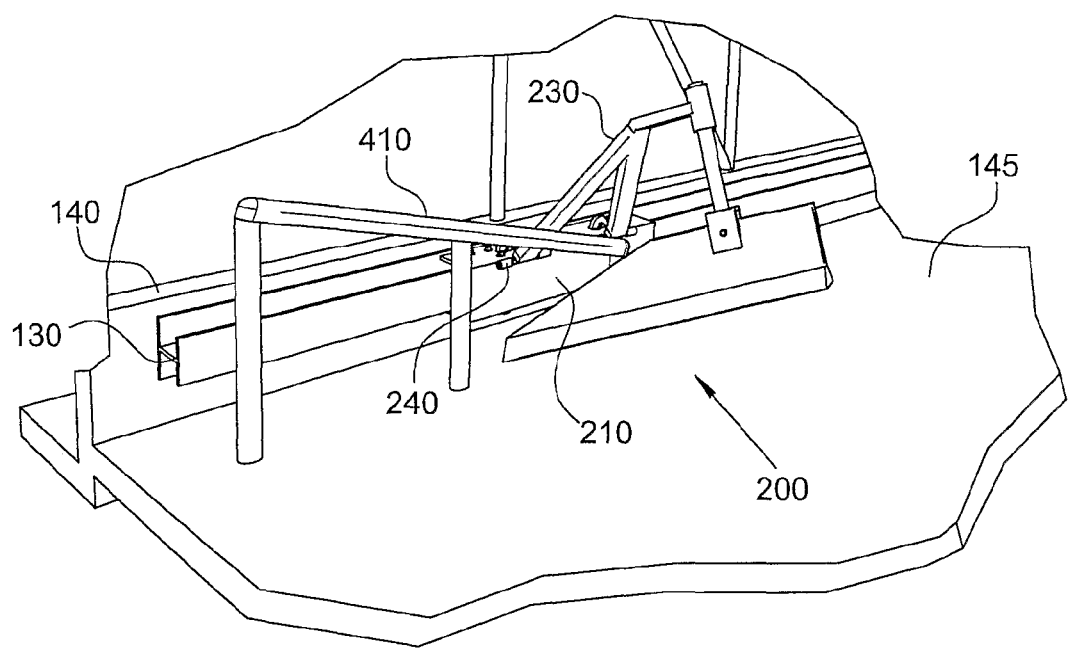
FIGS. 4a and 4b are respectively oblique view and side view representations of a feed shifting system in a raised configuration in accordance with another embodiment of the present invention.
Figure 4B:
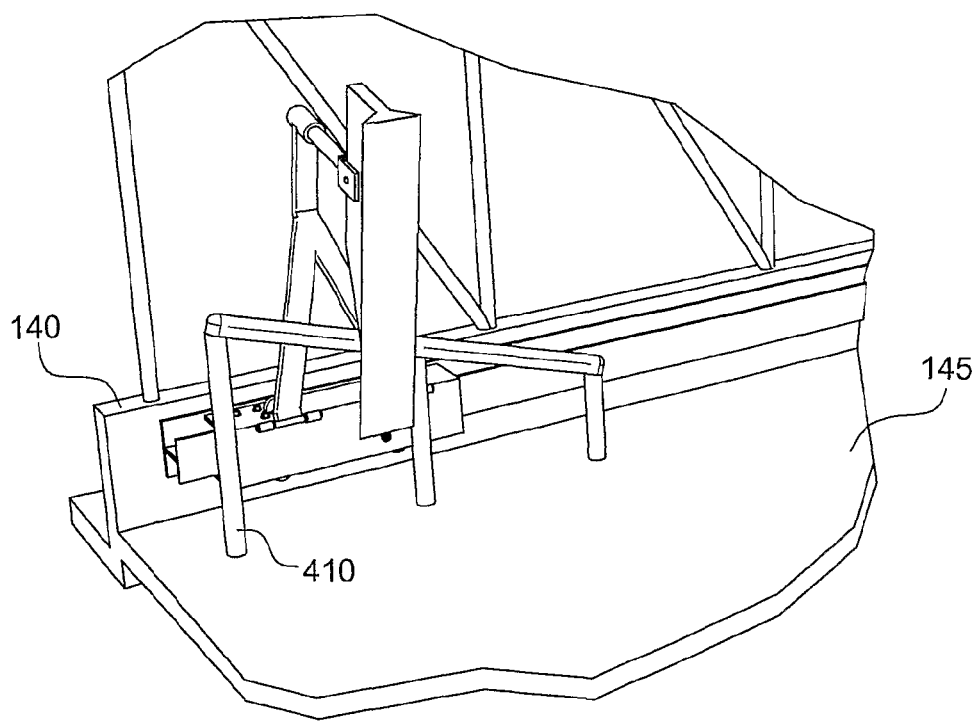

Reference is made to FIGS. 4a and 4b illustrating respectively oblique view and side view representations of a feed shifting system, according to another embodiment of the invention. With particular reference to FIG. 4a, the traveling unit 200 is shown configured to slide along a diagonal ramp 410. It is noted that movement along the ramp 410 causes the supporting arm 230 to rotate about the second connecting-pin 240 via which it is coupled to the shuttle 210. In this manner the traveling unit 200 is raised.

Referring now to FIG. 4b the supporting arm 230 and the push-head 220 are folded upward into a lifted configuration. It is noted that the lifted configuration conveniently frees up floor area for other operations when traveling unit 200 is not in use. Optionally, the ramp 410 may be a metal pipe along which the supporting arm slides although other variations and materials may be preferred.

In alternative embodiments, a means for folding and a means for unfolding the travelling unit 200 or a part thereof toward barrier 140 are provided. For example, there may be one or more joints (not shown) along the arm 230, and the means may be a clasp (not shown) connected to the barrier 140 and configured to clasp the arm 230 between the barrier 140 and the joint when the unit 200 travels to the end of the rail proximal to the clasp, the part of the arm 230 after the joint folding in the direction in which the travelling unit 200 is travelling as a result of the kinetic energy of the unit 200. Similarly, reversing the direction of the unit 200 releases the arm 230 from the clasp and unfolds the arm. Some systems 100 may further comprise a trigger, unfolding means being capable of forcing the trigger (not shown) to allow unfolding of the arm 230, and unfolding means capable of forcing the same trigger to fasten the arm 230 in an unfolded position.

Folding means, such as the ramp 410, may be passive elements attached or attachable to the surface 145 and/or to the barrier 130, such that the folding is entirely powered by the motor. Thus, one motor may be sufficient for the entire gamut of operations through which the travelling unit 200 undergoes in one direction of movement of the unit 200 along the rail 130. In some embodiments, the same motor may serve for the movement of the unit 200 in the opposite direction (the unit may for example first move from a first end of the rail to a second end, fold to a resting position, unfold and then travel back to the first end, refold to a resting position, unfold again, and repeat the cycle, using a single motor for the entire cycle or a different motor for each direction). In some embodiments, one motor may even suffice for the entire operational cycle of a multitude of units 200.

It will occur that folding means in some embodiments is situated at one end only of the rail 130.

Optionally, switching sensors may be installed in the feed shifting system 100 for stopping the motor when the traveling unit 200 reaches an extremity of the rail 130. Furthermore, protective sensors may be provided for cutting off power to the motor in case of a hazard such as a fault, a very large obstacle on the track, the motor overheating or such like.

Reference is now made to FIGS. 5a-e showing schematic representations of a shuttle 210 for use with feed shifting systems according to various embodiments of the present invention. FIG. 5a shows a top view of the shuttle 210, FIG. 5b represents a section through the shuttle 210 as viewed from the side of the supporting arm 230, FIG. 5c is a side view of the shuttle 210, FIG. 5d is a section through the shuttle 210 and the rail as viewed in line with the rail and FIG. 5e is a section similar to 5d showing one of shovels 520.

The shuttle 210 is configured to ride along a rail 130 mounted to a barrier 140 via a supporting plate 245. The shuttle 210 includes a frame 511, a set of guide wheels 510A-D, 530A-F and two shovels 520A, 520B.

The shovels 520A, 520B are attached to both ends of the shuttle so as to remove debris from the rail as the shuttle travels along in either direction. Two vertical guide wheels 510A, 510B rest upon the upper surface of the rail 130 and two vertical guide wheels 510C, 510D rest upon the lower surface of the rail 130, to facilitate movement of the shuttle 210 along the rail. Horizontal guide wheels 530A-F are optionally provided for further support to the shuttle 210 and to further facilitate movement of the shuttle 210 along the rail 130.

Conveniently, the shuttle 210 is slidably mounted onto a T-shaped rail 130 that is connected to the supporting plate 245, which is bolted to the barrier 140. The supporting arm 230 is rotatably coupled to shuttle 210 via a connecting-pin 546 through a hinge 240 connected to the shuttle 210 via hinge plates 542. The above described embodiment is provided as an illustration only, it will be clear to a person who is skilled in the art that other implementations of shuttle 210 are possible.

Advantageously, a timing mechanism may be used to control operation of the feed shifting system 100, thus automatically raking food at known time intervals. Alternatively, in other embodiments of the invention, operation of feed shifting system 100 is substantially continuous. According to other embodiments of the invention, the feed shifting system 100 is configured to operate at predetermined intervals for predetermined time durations. According to still other embodiments of the invention, the feed shifting system 100 includes or is connected to one or more sensors for enabling timing operation of feed shifting system 100.

Reference is now made to FIG. 6 showing a flowchart representing a method for moving scattered material closer to a barrier according to another embodiment of the invention. The method includes the steps: providing at least one shuttle—step (a), providing at least one push-head—step (b) coupling the shuttle to a driving unit—step (c), coupling at least one push-head to the shuttle—step (d), driving the shuttle such that said push-head travels over a surface thereby pushing scattered material towards the barrier—step (e.

To describe another embodiment, the driving in step is defined as driving in a first direction. In the other embodiment, the system further comprises a folding means and unfolding means, and a rail connected to a barrier. The driving unit preferably comprises a first remote motor. The method may further comprise: further driving said shuttle until said shuttle reaches said folding means, upon which said push-head is folded—step (f), and driving said shuttle in a second opposite direction such that said push-head is unfolded and travels over said surface thereby pushing scattered material towards said barrier—step (g).

The order in which the steps of the method are executed may vary according to requirements. In particular it is noted that step (c) may follow step (d) such that the push-head is coupled to the shuttle before the shuttle is coupled to the driving unit, for example by mounting the shuttle to the rail.

Typically, step (c) of coupling the shuttle to a driving unit comprises the substeps: providing a remote motor—step (c1), coupling the motor to a transmission mechanism—step (c2), and coupling the shuttle to the transmission mechanism—step (c3).

Where more than one push-head is provided and a first push-head is already coupled to said shuttle, step (d) of coupling the shuttle to a driving unit may comprise these substeps: removing the first push-head—step (d1), selecting a second push-head—step (d2), and coupling the second push-head to the shuttle—step (d3).

The embodiments are very compact and simple, composed of few parts, driven by merely one or two safe remote motors, and minimally obtrusive and highly safe to feeding livestock.

The embodiments may be very useful for example in situations where a livestock is required to extend their heads extended periods of time beyond the barrier, for example for a veterinarian inspection. In such situations is it important that the system 100 be capable of safely operating without necessitating retraction of the livestock's heads during the shifting of material, as opposed to some other material shifting systems that may require extended cessation of their operation at such times, that might cost loss of feeding time and accumulation of interfering waste.

The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A material-shifting system for shifting scattered material on a surface closer to a barrier, the system comprising:
   a rail connected to a barrier separating an animal from a feeding surface;
   a travelling unit comprising at least one push-head coupled to a shuttle;
   a driving unit comprising a first remote motor coupled to said shuttle via a transmission mechanism; and
   a folding means,
   wherein the system is configured to allow the first motor to:
   drive said shuttle along the rail in at least a first direction,
   push the scattered material via said push-head on the feeding surface towards said barrier, and
   fold the travelling unit when the shuttle reaches said folding means, and allows the travelling unit to unfold when the shuttle is driven along the rail in a second opposite direction.

2. The system of claim 1 wherein said transmission mechanism comprises at least one element selected from the group comprising: a cable-drive, a rope-drive, a chain-drive, wires, links, rollers, and sprockets.

3. The system of claim 1 wherein said first remote motor is coupled to a plurality of said shuttles for moving scattered material in more than one location.

4. The system of claim 1, the system further configured to:
   allow the first motor to drive said shuttle along the rail in the second direction.

5. The system of claim 1, further comprising a second remote motor, wherein the system is further configured to allow said second remote motor to drive said shuttle in the second direction such that said travelling unit unfolds, and to push via said push-head, scattered material on the surface towards said barrier.

6. The system of claim 1 wherein said push-head is coupled to said shuttle via a non-extendible supporting arm.

7. The system of claim 6 wherein said supporting arm is rotatably coupled to said push-head via a first connecting-pin perpendicular to said rail.

8. The system of claim 7 further comprising a restraint for restricting movement of said push-head about said first connecting-pin.

9. The system of claim 8 wherein said restraint has an adjustable length.

10. The system of claim 9 wherein said restraint is selected from at least one of a group comprising a chain, a cable, a wire, a spring and a rope.

11. The system of claim 7 wherein said supporting arm is rotatably coupled to said shuttle via a second connecting-pin parallel to said rail.

12. The system of claim 11 wherein-said supporting arm is rotated about said second connecting-pin thereby raising or folding sideways said push-head when said shuttle reaches said folding means.

13. The system of claim 1 wherein at least one said push-head comprises at least one of the group comprising: a scraper, a blade, a comb, a brush, a toothed wheel, a chain and a shovel.

14. The system of claim 1 wherein at least one said push-head is interchangeable for at least one alternative push-head.

15. The system of claim 1 wherein a plurality of push-heads are coupled to said shuttle.

16. The system of claim 1 further comprising at least one shovel coupled to said shuttle for scraping dirt off said rail.

17. The system of claim 1 wherein said driving unit comprises an automatic stop mechanism for stopping the motion of said shuttle in response to at least one of the following conditions: a. a signal is received from an extremity sensor indicating that the shuttle has reached an extremity of said rail; b. an obstruction is detected along the rail; and c. said system overheats.

18. The system of claim 1, wherein,
   the barrier has an uppermost surface over which the animal's head extends to reach the scattered material located on the feeding surface, and
   the rail is connected to the barrier at a level lower than the uppermost surface of the barrier.

19. The system of claim 18, wherein the rail is a T-shaped rail connected to the barrier via a supporting plate.

20. An apparatus for pushing livestock feed within reach of livestock enclosed within a pen incorporating the system of claim 1.

21. A method for shifting material, scattered over a surface, closer to a barrier, said method comprising the steps:
   step (a)—providing folding means, and a rail connected to a barrier and at least one shuttle;
   step (b)—providing at least one push-head;
   step (c)—coupling said shuttle to a driving unit comprising a first remote motor;
   step (d)—coupling at least one said push-head to said shuttle;
   step (e)—first motor driving said shuttle in a first direction such that said push-head travels over said surface thereby pushing scattered material towards said barrier;
   step (f)—first motor further driving said shuttle until said shuttle reaches said folding means, whereupon the first motor folds said push-head;
   step (g)—driving said shuttle in a second opposite direction such that said push-head is unfolded and travels over said surface thereby pushing scattered material towards said barrier.

22. The method of claim 21 wherein step (c) of coupling said shuttle to a driving unit follows step (d) of coupling said push-head to said shuttle.

23. The method of claim 21 wherein step (c) of coupling said shuttle to a driving unit further comprises coupling said motor to a transmission mechanism, and coupling said shuttle to said transmission mechanism.

24. The method of claim 21 wherein a plurality of push-heads are provided and a first push-head is pre-coupled to said shuttle and wherein step (d) of coupling at least one said push-head to said shuttle, further comprises the following substeps:
   step (d1)—removing said first push-head;
   step (d2)—selecting at least a second push-head, and step (d3)—coupling said second push-head to said shuttle.

25. A material-shifting system for shifting scattered material on a surface closer to a barrier, the system comprising:
   a rail connected to a barrier separating an animal from a feeding surface, the barrier having an uppermost surface and the rail being positioned so that the animal's head extends over the upper most surface of the barrier and the rail to reach the scattered material located on the feeding surface;
   a travelling unit comprising at least one push-head coupled to a shuttle;
   a driving unit comprising a first motor coupled to drive said shuttle; and
   a folding means, wherein the system is configured so that the first motor
i) drives said shuttle along the rail in at least a first direction,
ii) pushes the scattered material via said push-head on the feeding surface towards said barrier, and
iii) folds the travelling unit when the shuttle reaches said folding means.

26. The system of claim 25, wherein, when the travelling unit is in a folded state, the travelling unit is allowed to unfold when the shuttle is driven along the rail in a second opposite direction.

27. A method for shifting material, scattered over a surface, closer to a barrier, said method comprising the steps:
operating a driving unit comprising a first motor driving a shuttle, the shuttle driven on a rail connected to a barrier, the shuttle coupled to a push-head so that
i) said first motor drives said shuttle in a first direction such that said push-head travels over said surface thereby pushing scattered material towards said barrier, and
ii) said first motor further drives said shuttle until said shuttle reaches a folding means, whereupon the first motor folds said push-head.

28. The method of claim 27, comprising the further step of driving said shuttle in a second opposite direction such that said push-head is unfolded and travels over said surface thereby pushing scattered material towards said barrier.

* * * * *